Patented May 21, 1946

2,400,709

UNITED STATES PATENT OFFICE 2,400,709

PROCESS OF PREPARING A GEL PRODUCT FOR ABSORPTION OF POISONOUS GASES

Walter A. Patrick, Jr., Mount Washington, Md., assignor to The Davison Chemical Corporation, Baltimore, Md., a corporation of Maryland No Drawing. Application March 28, 1942, Serial No. 436,664

1 Claim. (Cl. 252—190)

This invention relates to improvements in processes of preparing gels and to gel products resulting from such processes.

In Patent No. 2,258,099 granted October 7, 1941, a process is described in which a metal oxide gel, such as for instance alumina gel, is prepared by treating aluminum with an aqueous solution of a weak, volatile acid capable of forming a soluble salt of aluminum, which salt readily undergoes hydrolysis in an aqueous medium. A dispersion of aluminum oxide is thus formed which is converted to the gel phase by dehydration.

More specifically, a dispersion of aluminum oxide, as set forth in the above patent, is prepared by treating metallic aluminum with an aqueous solution of acetic acid of substantially one to five per cent concentration. A too concentrated acetic acid solution is apt to result in the formation of an aluminum acetate product which will not gel. By bringing together two parts by weight of aluminum and about one hundred parts by weight of water containing about one part by weight of acetic acid, a dispersion of aluminum oxide of a desired concentration may be prepared. Dispersions containing about one per cent to about five per cent aluminum oxide have been found satisfactory for the formation of a gel.

It has been found, in the process of the present invention, that highly useful gel products may be prepared from dispersions of metal oxides and particularly from dispersions prepared in the manner set forth above. In the commercial production of alumina gel it is important to obtain a hydrogel of proper consistency such that it may be easily handled without undue loss of material. By addition of a water-soluble, non-electrolytic, organic compound to said dispersions the aluminum oxide is converted to hydrogel having highly desirable characteristics particularly for production on a commercial scale. This hydrogel is comparatively firm and is easily handled during a washing or drying operation. Losses are thus greatly decreased and the efficiency of a plant is appreciably increased.

An organic compound that is found to be particularly appropriate as a coagulating or gelling agent in the present process is hexamethylene tetramine, $(CH_2)_6N_4$, known commercially as urotropine or formin. No particular precautions are necessary in the use of this agent for coagulating purposes. It may be used in solid form or in solution. Furthermore when used in excess it may be retained in the gel product without injurious effects and for certain useful purposes set forth below.

Urea, $CO(NH_2)_2$, may also be used in place of urotropine either in solid form or in solution. These agents are added to an aluminum oxide dispersion preferably in such amounts as to bring the mixture ultimately to a pH of 5.6, which is a favorable condition for the formation of a gel.

After the hydrogel has formed it is dried and activated by heating at atmospheric pressures or by vacuum treatment or other equivalent dehydration procedures. The activated gel is a hard, transparent, amorphous, glassy product having great heat stability, and having exceedingly fine capillaries of a diameter less than a wave length of visible light. It withstands the effects of high temperatures, for instance, red heat. Furthermore, the gel has a high adsorbency coefficient and exerts a powerful catalytic function.

For purposes of illustration, the following example is provided: To a sol containing about three per cent by weight of aluminum oxide in an aqueous medium, about two-tenths of one per cent by weight of urotropine (based on the weight of the resulting mass) are added and distributed throughout the dispersion. The dispersion is maintained at about 50° to 60° C. for about one hour. The hydrogel thus formed is dried, and activated by heating at a temperature of substantially 300° C. to 500° C. Washing of the hydrogel is not necessary since the urotropine is volatilizable by heat.

If an excess of urotropine is desired in the final gel product a greater proportion of urotropine is added to the above dispersion and activation is conducted at a lower temperature. A gel product containing urotropine in its pores is prepared by mixing about two per cent by weight of this agent with the above three per cent dispersion of aluminum oxide, maintaining the resulting mixture at room temperature for about one to two hours, drying the mixture, and activating or heating the gelled mass at a temperature not above about 150° C. or in the range of about 125° C. to 150° C. for a relatively short period.

The products prepared by the above procedures are particularly valuable in gas treating processes, for humidity control, and adsorption as well as catalytic processes. A product containing an excess of the coagulating agent such as urotropine is highly effective in gas masks for preventing poisoning from gases containing such compounds as phosgene. Phosgene reacts with urotropine to form a solid compound $(COCl_2.2C_6H_{12}N_4)$ thereby preventing the destructive effects of the gas.

It is possible to form a poison gas-treating product from a hydrogel of alumina, silica, or mixtures of the two, or of other metal oxides, by impregnating the hydrogel with a solution of urotropine and finally dehydrating the resulting mass, to form a gel having within its cavities solid urotropine. A gel product thus prepared for phosgene absorption is not as satisfactory as one formed by the gelling of a sol with urotropine in the manner described above.

What is claimed is:

A process for preparing an agent suitable for absorption of poisonous gases including phosgene which process comprises: the successive steps consisting of forming an alumina hydrogel by bringing together an aqueous dispersion of an alumina sol, of the concentration of about one per cent to about five per cent of aluminum oxide, and solid hexamethylene tetramine in amount in excess of that necessary to form said hydrogel, drying the hydrogel so formed, and heating the dried hydrogel to a hard, glassy gel mass while retaining hexamethylene tetramine in the cell structure of the said gel mass.

WALTER A. PATRICK, Jr.